March 19, 1957  L. W. POLLOCK  2,785,769
CARBON BLACK SEPARATION
Filed Dec. 29, 1952  2 Sheets-Sheet 1
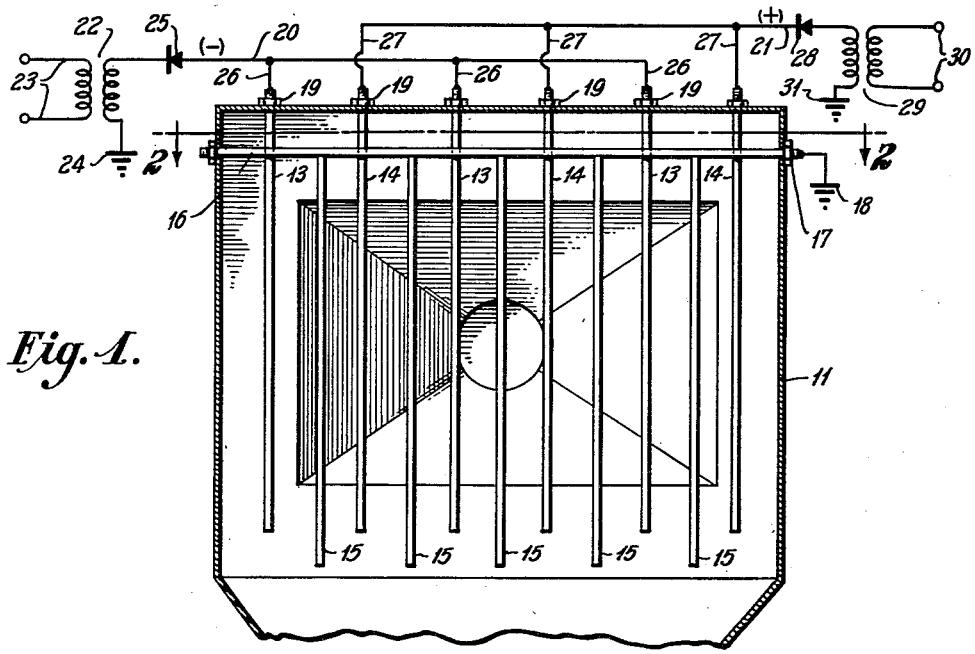
Fig. 1.
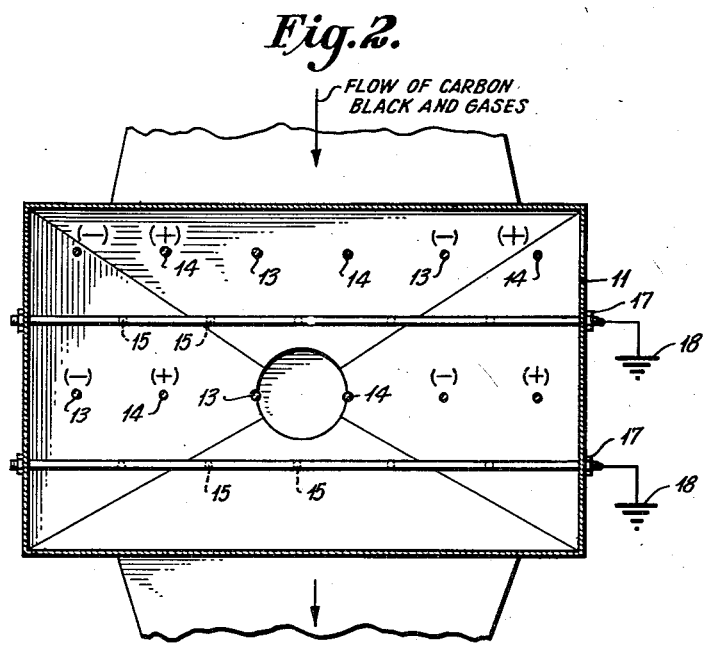
Fig. 2.
INVENTOR.
L. W. Pollock
BY
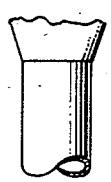
ATTORNEYS March 19, 1957 L. W. POLLOCK 2,785,769
CARBON BLACK SEPARATION
Filed Dec. 29, 1952 2 Sheets-Sheet 2
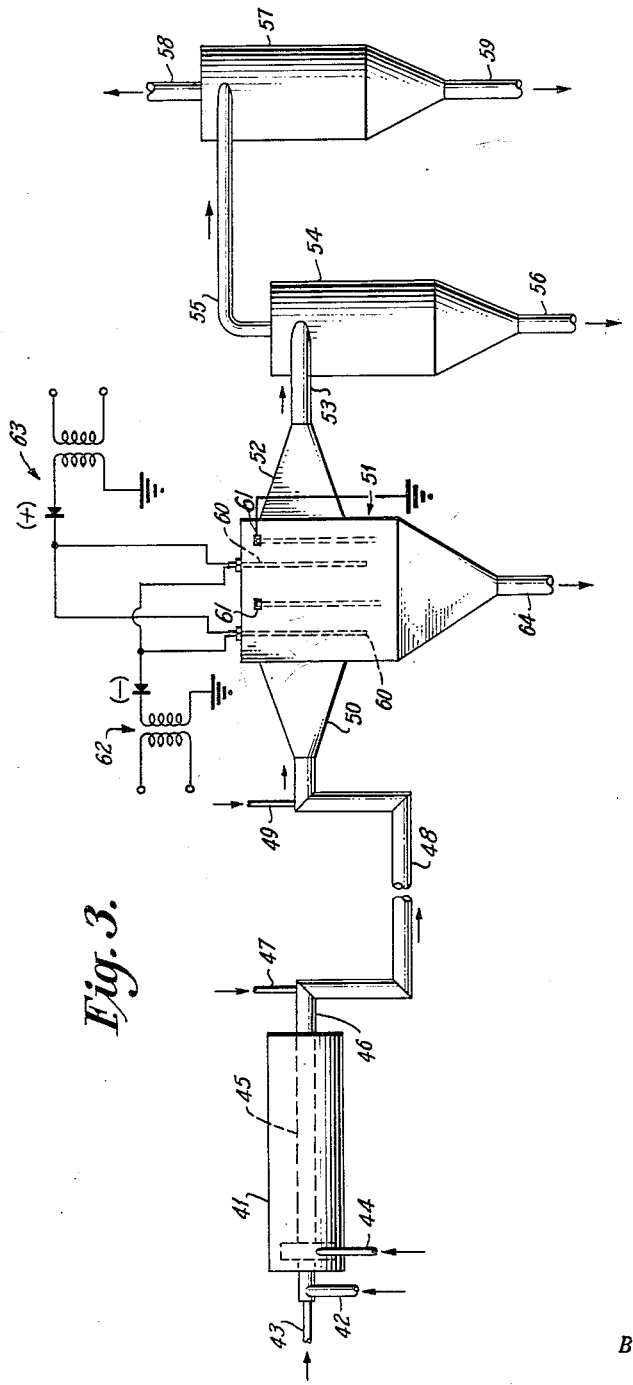
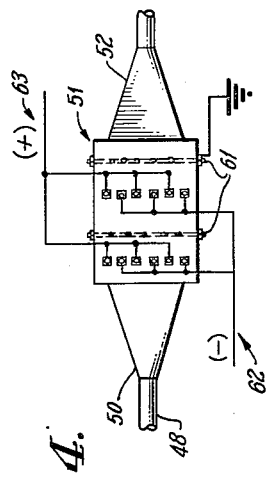
INVENTOR.
L. W. Pollock
BY
Hudson & Young
ATTORNEYS United States Patent Office 2,785,769
Patented Mar. 19, 1957

2,785,769

CARBON BLACK SEPARATION

Lyle W. Pollock, Bartlesville, Okla., assignor to Phillips Petroleum Company, a corporation of Delaware Application December 29, 1952, Serial No. 328,339

9 Claims. (Cl. 183—114)

This invention relates to a process and apparatus for the separation and recovery of carbon black or other finely divided solid matter from suspending gases. In one aspect it relates to an apparatus and process for the separation and recovery of carbon black from the gaseous effluent of the carbon black furnace. In another aspect it relates to an apparatus and process for the separation and recovery of carbon black from the effluent of the carbon black production furnace by electrostatic agglomeration.

As now practiced in the manufacture of carbon black from hydrocarbons by furnace processes, the effluents from the furnaces or reactors are passed through waterspray and pipe coolers and then through one or more electrostatic precipitators for carbon recovery. In electro-precipitators the carbon black particles are given an electrostatic charge by a series of electrodes and at least a portion of the black is deposited upon grounded electrodes. Deposited carbon black is knocked off or falls off the grounded electrodes and is collected in a hopper. Gases containing the remainder of the carbon black in suspension is then passed to one or more cyclone or other type separator as desired.

An object of my invention is to provide an apparatus and a method for recovering carbon black from the gaseous effluent of carbon black production furnaces.

Another object of my invention is to provide an apparatus and a method for recovering carbon black in a high yield from the gaseous effluent of carbon black production furnaces.

Still another object of my invention is to provide apparatus and a process which is adaptable to treating large volumes of carbon black production furnace effluent for the recovery of carbon black at a minimum of cost.

Still another object of my invention is to devise a process for separating finely divided, dusty matter from suspension in gases.

Yet another object of my invention is to provide an apparatus for carrying out the separation process of my invention which apparatus is relatively simple to construct and operate.

I achieve these and other objects by passing carbon black containing furnace effluent through a vessel provided with negatively charged electrodes, positively charged electrodes and grounded electrodes, in such a manner that carbon black particles negatively charged upon contact with carbon black particles positively charged become agglomerated and deposited upon the grounded electrodes.

In the drawing,

Figure 1 illustrates diagrammatically one arrangement of apparatus parts for carrying out the process of my invention.

Figure 2 is the cross-sectional view of a portion of my apparatus taken on a line 2—2 of Figure 1.

Figure 3 illustrates, diagrammatically, a carbon black production and recovery system employing the apparatus of Figures 1 and 2.

Figure 4 is the plan view of the portion of the apparatus of Figure 3.

Referring to the drawing and specifically to Figure 1, a vessel 11 is provided with some electrodes 13 extending through the vessel's top wall. These electrodes are insulated by insulators 19 from the top metal wall of the vessel. The several electrodes 13 are connected by lead wires 26 to a common conduit 20 which conducts, for example, negative electricity for charging the electrodes 13. A rectifier 25 connects the lead wire 20 with one terminal of the secondary winding of a transformer 22. The other terminal of this secondary winding is grounded at 24. The primary connections 23 of the transformer are connected to a source of alternating current, not shown.

For supplying positive electricity to some positive electrodes 14 is an electrical apparatus more or less similar to that just described. Connected to the electrodes 14 are lead wires 27 which are connected to a main conduit 21. Conduit 21 is connected with the rectifier 28 which in turn is connected to one terminal of the secondary winding of a transformer 29. The other terminal of the secondary winding is grounded at 31. The primary winding of this transformer is connected by lead wires 30 to a source of alternating current, not shown.

Exposed within vessel 11 are some grounded electrodes 15. A grounded electrode is indicated as being disposed midway of each pair of electrodes of unlike sign but at a spaced distance therefrom in a downstream direction with respect to the direction of gaseous flow. These grounded electrodes 15 are supported by a support member 16 which extends through the walls of vessel 11. A support member 16 may be connected to the metal walls of vessel 11 by element 17 which in turn is grounded at 18. Thus, these ground electrodes 16 are always maintained at ground potential.

Upon reference to Figure 2 of the drawing the exact positioning of the negative and positive electrodes 13 and 14, respectively, and of the ground electrodes 15 may be clearly observed. The negative and positive electrodes are disposed in rows transverse to the direction of flow of the carbon black containing gases. Disposed in the downstream direction from the first row of negative and positive electrodes is a row of grounded electrodes 15. The negative electrodes and the positive electrodes are positioned sufficiently far apart to eliminate all possible chances of arcing. In like manner the grounded electrodes 15 are positioned sufficiently far down stream as regards direction of carbon black flow as not to arc with either the negative or the positive electrodes. Further down stream from the first row of grounded electrodes may be disposed another row of negative and positive electrodes similar to that just described. Depending upon the degree of separation and recovery of carbon black desired in an electrostatic agglomeration apparatus there may be as many rows of negative and positive electrodes each followed by a row of grounded electrodes, as desired.

In the operation of this apparatus it is intended that negative electrostatic charges be emitted from electrodes 13 and that carbon black particles in the immediate vicinity acquire the emitted charges. In like manner carbon black particles passing in the immediate vicinity of the positive electrodes receive a positive charge. As the negatively charged carbon black and positively charged carbon black pass downstream from their charging electrodes many of the carbon black particles so charged will contact each other and agglomerate. It is known that negatively charged particles and positively charged particles attract each other and tend to form agglomerates. When these agglomerates are formed or are forming they are attracted to grounded electrodes 15. In this manner I am able to operate an apparatus of this nature with relatively high recovery of carbon black from the gas. As mentioned hereinabove the greater the number of units of positive and negative electrodes and grounded electrodes used in the system the greater is the recovery of carbon black from the gases.

The carbon black not recovered by the grounded electrodes 15 may be in the form of recoverable agglomerates and these carbon black agglomerates may be recovered from the suspended gases in cyclonic separators or in bag filters, or in both.

In reference to Figure 4, which is a plan view of the top of the electrostatic agglomeration vessel illustrated in Figure 3, there may be seen the electrical wiring leading from the source of negative and positive electricity to the respective electrodes. In this figure reference numeral 62 identifies the source of negative electricity and it may be seen that the lead wire from this source of current leads to alternate electrodes in two rows of electrodes across the vessel.

This vessel is broadly identified by reference numeral 51. On the opposite side of the vessel 51 is shown broadly a source of positive electricity 63. This source of positive electricity is connected with electrodes positioned alternately with respect to the electrodes connected to the negative source of electricity. The effluent gases containing carbon black in suspension enter this vessel 51 from conduit 50 and leave the vessel by way of conduit 52 for further treatment.

On reference to Figure 3 of the drawing which illustrates a carbon black production and separation system, reference numeral 41 identifies a carbon black production furnace. Such a carbon black production furnace and its method of operation are fully described in U. S. Patent 2,564,700. Reference numeral 45 identifies the reaction zone. A hydrocarbon charge oil is passed through a line 43 into the reaction zone and air is introduced through a line 42 to prevent carbon deposition at the furnace end of the charge inlet 43. Air for combustion of a portion of the charge hydrocrabon or a combustible mixture of air and a fuel gas for supplying heat for conversion of hydrocarbon to carbon black is introduced tangentially into the reactor through a line 44. The tangential injection is made at a high velocity to impart a helical motion to the tangentially injected gases so that they will adhere to the furnace wall by centrifugal force to protect the walls against carbon deposition from the central core of carbon producing gases. The carbon black particles formed in reactor 41 pass as a gaseous suspension through a pipe 46 which contains a water spray 47 for cooling the furnace effluent from the furnace temperature to a temperature sufficiently low to arrest further reaction, for example about 1500° F. or a little less. An air cooling zone 48, which comprises an extended length of bare pipe, is provided for further cooling of the quenched effluent by the atmosphere to a temperature within the range of about 400° to 600° F. A second water quench 49 may be employed if desired.

Another type of furnace useful in producing another type of carbon black is described in U. S. Patent 2,375,795. These and other carbon black producing processes and apparatus can be employed to produce carbon black which can be separated and recovered from their suspending gases according to this invention. The cooled gases containing carbon black in suspension from the air cooler pipe 48 may, if desired, be further cooled with water spray 49, as mentioned above. This so-cooled suspension is then passed through inlet 50 into the agglomeration apparatus 51 of my invention. In this apparatus a portion of a carbon black receives negative charges, and a portion receives positive charges. Negatively charged particles and positively charged particles, when sufficiently near one another, are attracted to each other and agglomerate with the formation of larger and more easily separable agglomerates of carbon black. A portion of these agglomerates is attracted by the grounded electrodes 15 and that carbon black not so separated from the suspending gases passes on from vessel 51 through outlet 52 and conduit 53 into a cyclonic separator 54. In this separator 54 the inlet material travels circumferentially at a high velocity and the carbon black is thrown outward by centrifugal force and collects along the cylindrical wall of the vessel. As the quantity of deposited black increases it settles and is ultimately removed through outlet conduit 56. The gases of reduced carbon black content are removed from this separator 54 through the conduit 55 and passed to a second cyclonic separator 57. In this separator an additional amount of carbon black is recovered from the gases. The effluent stripped of its carbon black content is withdrawn from vessel 57 through a conduit 58 for such disposal as desired. The separated carbon black is removed from vessel 57 through a conduit 59 for such further processing or such disposal as desired.

The source of negative electricity applied to the negative electrodes of the apparatus in Figure 3 is identified by reference numeral 62 while the source of positive electricity is identified by reference numeral 63. The electrically charged electrodes are identified in vessel 51 of Figure 3 by reference numeral 60 while the grounded electrodes are identified by reference numeral 61. The carbon black which adheres to the grounded electrodes 61 and is knocked off or falls off is recovered through a conduit 64.

Materials for construction of the apparatus of my invention may be selected from among those commercially available and satisfactory for the purpose at hand. Such process, operating and control equipment as fans or blowers or temperature indicating and recording apparatus, valves, pumps, etc. are not shown for purposes of simplicity and brevity. The need and use of such auxiliary equipment is well understood by those skilled in the art.

The transformers may be of any desired type suitable to transform available alternating current to alternating current of 5,000 to 60,000 volts or more. Under some conditions it is desirable to employ potentials as high as 100,000 volts at the electrodes.

While I have described my invention as being directed to the separation of carbon black from suspending gases, it is not intended to be limited thereto since it is useful for separating industrial dust from air or even atmospheric dust from air.

While certain embodiments of the invention have been described for illustrative purposes, the invention obviously is not limited thereto.

Having described my invention, I claim:

1. A process for agglomerating carbon black contained as finely divided, suspended carbon black in a carbon black production furnace effluent comprising subjecting a portion of the effluent to an electrostatic charge of one sign, simultaneously subjecting the remaining and parallel portion of the effluent to an electrostatic charge of the opposite sign, admixing the charged portions of effluent and subjecting the admixed effluent previously subjected to the electrostatic charges to the influence of a grounded contact and recovering agglomerated carbon black therefrom.

2. A process for agglomerating carbon black contained as finely divided, suspended carbon black in a carbon black production furnace effluent comprising subjecting adjacent portions of said effluent simultaneously to electrostatic charges of unlike sign, subjecting the so treated effluent to the influence of a grounded contact and recovering agglomerated carbon black.

3. A process for agglomerating carbon black contained as finely divided, suspended carbon black in a carbon black production furnace effluent comprising subjecting adjacent portions of a stream of said effluent simultaneously to electrostatic charges of unlike signs, subjecting the whole of the so treated effluent to the influence of a grounded contact thereby separating a portion of the agglomerated carbon black from the suspending gases, and recovering additional carbon black from the suspending gases by cyclonic action.

4. A process for recovering finely divided solid matter from suspension in a gas comprising subjecting adjacent portions of said suspension in a gas simultaneously to electrostatic charges of unlike signs, subjecting the whole of the so treated gaseous suspension to the influence of a grounded contact and recovering the agglomerated solid matter.

5. A process for agglomerating carbon black contained as finely divided, suspended carbon black in a carbon black production furnace effluent comprising subjecting adjacent cross sectional portions of a stream of said effluent simultaneously to electrostatic charges of unlike signs, subjecting the whole of the so treated effluent to the influence of a grounded contact thereby separating a portion of the agglomerated carbon black from the suspending gases, and recovering additional carbon black from the suspending gases by cyclonic action.

6. A process for agglomerating carbon black contained as finely divided, suspended carbon black in a carbon black production furnace effluent comprising continuously introducing a stream of said effluent into an electrostatic precipitation zone having an inlet and an outlet as regards furnace effluent flow, subjecting a portion of said effluent in said zone to an electrostatic charge of one sign, simultaneously subjecting the remaining and parallel portion of the furnace effluent to an electrostatic charge of the opposite sign in said zone, mixing the charged portions of effluent, subjecting the mixed portions of the effluent to the influence of a grounded contact in said zone and recovering agglomerated carbon black and the so treated furnace effluent deleted of a portion of its carbon black content separately from said zone.

7. A process for agglomerating carbon black contained as finely divided, suspended carbon black in a carbon black production furnace gaseous effluent cooled to a temperature of about 400° to 600° F. comprising passing the so-cooled carbon black suspended in carbon black furnace effluent gases into a zone and therein subjecting a portion of the effluent to an electrostatic charge of one sign, simultaneously subjecting the remaining and parallel portion of the effluent to an electrostatic charge of the opposite sign, mixing said portions of effluent and subjecting the mixed effluent to the influence of a grounded contact and recovering agglomerated carbon black from said zone.

8. A process for agglomerating carbon black contained as finely divided carbon black suspended in carbon black production furnace gaseous effluent cooled to a temperature of about 400° to 600° F. comprising continuously introducing a stream of the so-cooled effluent into an electrostatic precipitation zone having an inlet and an outlet as regards furnace effluent flow, subjecting alternate and parallel portions of said effluent in said zone to an electrostatic charge of one sign, simultaneously subjecting the remaining and parallel portions of the furnace effluent in said zone to an electrostatic charge of the opposite sign, mixing said portions of effluent, subjecting the mixed effluent to the influence of a grounded contact in said zone and recovering agglomerated carbon black and the so-treated furnace gaseous effluent separately from said zone.

9. A process for agglomerating carbon black contained as finely divided, suspended carbon black in a carbon black production furnace gaseous effluent cooled to a temperature of about 400° to 600° F. comprising subjecting adjacent cross sectional portions of a stream of said effluent simultaneously to electrostatic charges of unlike signs, subjecting the so treated effluent portions to the influence of a grounded contact whereby a portion of the agglomerated carbon black is separated from the suspending gases, and recovering additional carbon black from the suspending gases by cyclonic action.

References Cited in the file of this patent

UNITED STATES PATENTS

| Number | Name | Date |
|---|---|---|
| 1,446,778 | Witte | Feb. 27, 1923 |
| 1,765,991 | Miller | June 24, 1930 |
| 1,883,372 | Hedberg | Oct. 18, 1932 |
| 2,121,633 | Hartman et al. | June 21, 1938 |
| 2,420,999 | Ayers | May 27, 1947 |
| 2,470,056 | MacKenzie | May 17, 1949 |
| 2,511,088 | Whaley | June 13, 1950 |
| 2,634,818 | Wintermute | Apr. 14, 1953 |